(12) United States Patent
Qiang

(10) Patent No.: US 8,706,084 B2
(45) Date of Patent: Apr. 22, 2014

(54) ROAMING SELECTION OF A V-EPDG

(75) Inventor: Zu Qiang, Kirkland (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/528,193

(22) Filed: Jun. 20, 2012

(65) Prior Publication Data

US 2012/0322412 A1 Dec. 20, 2012

Related U.S. Application Data

(60) Provisional application No. 61/498,863, filed on Jun. 20, 2011.

(51) Int. Cl.
*H04W 88/02* (2009.01)

(52) U.S. Cl.
USPC .......................................................... 455/411

(58) Field of Classification Search
USPC .......................................................... 455/411
See application file for complete search history.

(56) References Cited

U.S. PATENT DOCUMENTS

| | | | | |
|---|---|---|---|---|
| 2009/0265543 | A1* | 10/2009 | Khetawat et al. | 713/151 |
| 2011/0261787 | A1* | 10/2011 | Bachmann et al. | 370/331 |
| 2012/0295617 | A1* | 11/2012 | Anchan et al. | 455/435.1 |
| 2013/0114446 | A1* | 5/2013 | Liu et al. | 370/252 |
| 2013/0114463 | A1* | 5/2013 | Li | 370/254 |

FOREIGN PATENT DOCUMENTS

| | | |
|---|---|---|
| EP | 2 194 686 A1 | 6/2010 |
| WO | 2008/155066 A2 | 12/2008 |
| WO | 2010/086029 A1 | 8/2010 |

OTHER PUBLICATIONS

3GPP TS 23.402 V10.4.0: $3_{rd}$ Generation Partnership Project; Technical Specification Group Services and System Aspects; Architecture enhancements for non-3GPP accesses (Release 10); Jun. 2011; 231 pages.
3GPP TS 29.234 V9.2.0: $3^{rd}$ Generation Partnership Project; Technical Specification Group Core Network and Terminals; 3GPP system to Wireless Local Area Network (WLAN) interworking; Stage 3 (Release 9); Jun. 2011; 96 pages.
3GPP TSG-SA2 Meeting #64, Change Request, S2-082195; Jeju Island, Korea, Apr. 7-11, 2008; 5 pages.
International Search Report for PCT/IB2012/053124, mailing date of Dec. 5, 2012; 8 pages.
ETSI TS 123 401 V10.4.0: LTE; General Packet Radio Service (GPRS) enhancements for Evolved Universal Terrestrial Radio Access Network (E-UTRAN) access (3GPP TS 23.401 version 10.4.0 Release 10); Jun. 2011; 283 pages.

* cited by examiner

*Primary Examiner* — Diane Mizrahi
(74) *Attorney, Agent, or Firm* — Ericsson Canada Inc.

(57) ABSTRACT

When a mobile device attaches to a non-3GPP network, it performs an AAA procedure with a 3GPP AAA. In addition to standard AAA process, the 3GPP AAA can perform a lookup based on information associated with the 3GPP AAA interactions to determine an appropriate vPLMN ID and v-ePDG address associated with the user equipment location. This information can then be provided to the UE so that its connection to the network can be appropriately configured.

16 Claims, 5 Drawing Sheets

ROAMING SELECTION OF A V-EPDG

CROSS REFERENCE TO RELATED APPLICATIONS

This application claims the benefit of priority to U.S. Provisional Patent Application 61/498,863 filed Jun. 20, 2011, the contents of which are expressly incorporated herein by reference.

TECHNICAL FIELD

This disclosure relates generally to the selection of a gateway in a mixed access environment

BACKGROUND

Modern mobile devices, such as tablet computers and mobile phone such as smartphones, often have both wireless networking (such as Wifi also referred to as 802.11x) connectivity and radio access network (such as EVDO, UMTS, HSPA, and LTE) connectivity. Such devices are typically associated with a mobile network carrier that has a geographically confined radio access network, but the carrier also often has roaming agreements with other carriers so that when a customer of a particular carrier visits a country served by a second carrier, the customer will be preferentially directed to use the services of the second carrier.

The roaming of a mobile device between networks is a well known technology, and the Radio Access Network part of the roaming is well known and documented. However, the manner in which a device roams when both radio access networks (such as those compliant with the $3^{rd}$ generation partnership project (3GPP) standards) and wireless networking access methods (such as those compliant with IEEE 802.11x standards) can be used is less clear.

As specified in 3GPP TS 23.402, when away from its home network a mobile device or other such user equipment (UE) selects an evolved packet data gateway (ePDG) based the Public Land Mobility Network (PLMN) ID. In a conventional roaming scenario, a UE receives a list of roaming networks that are available, and one of the networks can be selected, either in an automated fashion or through manual user selection. Based on the received visiting PLMN (vPLMN) ID, a UE can create a fully qualified domain name (FQDN), and based on the response from a domain name system (DNS) query on the created FQDN, an ePDG ID is selected, and an IPSec tunnel is establish. Typically, the creation of the FQDN is governed by rules set out in 3GPP TS 23.003 and the FQDN takes the form of "epdg.epc.mnc<MNC>.mcc<MCC>.pub.3gppnetwork.org", where the PLMN ID provide a mobile country code (MCC) and a mobile network code (MNC). If the vPLMN ID is unknown, the UE can construct a FQDN using its home PLMN ID.

A problem has arisen, that for a number of different reasons, some types of user equipment do not receive a roaming network list (e.g. when roaming to a region that does not support the RAN access type of the device) and when roaming is done over a non-3GPP access technology (such as WiFi). In such cases, there is no standardized solution for the UE to obtain the vPLMN ID. At present, this situation is addressed by the UE using the hPLMN ID.

As the reference architectures for Fixed Mobile Convergence (FMC) scenarios listed in TR 23.839, a hPLMN might have roaming agreements with several vPLMNs. A vPLMN can have business agreements with several Broadband Forum (BBF) domains, and vice versa as shown in FIG. 1. As shown in FIG. 1, a UE 50 is associated with a home PLMN 52. The UE is roaming and is connected to VPLMN #2 54 which has provided access to BBF #1 54. Thus, UE 50 is connected to HPLMN 52 though a combination of BBF #1 wifi network 54 and VPLMN #2 56. BBF#1 54 has a wifi network and has business relationships with VLPMN #3 58 which also has a roaming agreement with HPLMN 52. From this, one can see that the use of a BBF compliant Wifi network does not provide sufficient information about the roaming activities of the UE. VPLMN #1 60 also has a business relationship with BBF #1 54, but has no roaming agreement with HPLMN 52. A second wifi access provider BBF #2 also has business relationships with each of the VPLMNs.

As specified in 3GPP TS 24.302: the trust relationship of a non-3GPP IP access network is determined by the home PLMN operator. That trust relationship is indicated to the UE via the following methods:

Pre-configured policies in the UE by the home PLMN operator.

Dynamic indication during 3GPP-based access authentication.

When the access network is detected as an un-trusted access, the UE typically selects an ePDG using the hPLMN ID or vPLMN (at roaming case).

In these roaming scenarios, if the UE selects the ePDG that belongs to hPLMN, the UE traffic is routed to the hPLMN via the SWu/SWn interface. According to the IP routing implemented the SWu/SWn may not traverse the vPLMN. The S9* session may be established via V-PCRF or directly between the hPCRF and the BPCF, if allowed by agreement between the parties and the network configuration.

With implementation of the above, the UE traffic will bypass the VPLMN completely—the Internet becomes the transport network between the BBF domain and the hPLMN. The roaming scenario basically becomes a non-roaming scenario. In some cases, this might be a problem for the roaming agreement between partners. In other cases, some network initiated push service, e.g. policy control traffic, may not work without a roaming partner. Accordingly, a non-3GPP roaming mechanism that allows a roaming UE to find the correct v-EPDG, whether it can find the vPLMN ID or not is desirable.

One proposed solution is that when a device connects to a non-3GPP network, it will default to use the ePDG of the home network. The UE can connect to the ePDG through the Internet, and thus be governed by the policies of the PGW and the ePDG in home network. Although this provides a degree of management, it bypasses the closer v-eEPDGs, making the method less efficient, and could result in actions that violate currently agreed-upon roaming agreements.

Therefore, it would be desirable to provide a system and method that obviate or mitigate the above described problems

SUMMARY

It is an object of the present invention to obviate or mitigate at least one disadvantage of the prior art.

In a first aspect of the present invention, there is provided a method of configuring access through a non 3rd generation partnership project (3GPP) compliant access network for execution by a user equipment. The method comprises the steps of attaching to a non-3GPP compliant access network; connecting, through the attached access network, to an authentication server; and receiving an indication of a visiting Public Land Mobility Network (vPLMN) to connect to for access to 3GPP services.

In an embodiment of the first aspect of the present invention, the non-3GPP compliant access network is a WiFi access network. In another embodiment, the authentication server is a 3GPP compliant Authentication Authorization and Accounting (AAA) server, which is optionally associated with a home network associated with the UE. In a further embodiment, the indication of the PLMN is a PLMN Identifier or an address of a visiting enhanced packet data gateway (v-ePDG) associated with the PLMN. In a further embodiment, the method further comprises the step of reconfiguring access policies in the UE in accordance with the received indication.

In a second aspect of the present invention, there is provided a method of providing configuration data to a user equipment (UE) associated with a home subscriber server, the UE connected to a non 3rd generation partnership project (3GPP) compliant access network, the method for execution by the home subscriber server. The method comprises the steps of receiving, from an authentication server, an identification of the UE; in accordance with location information associated with the UE, selecting a visiting public land mobility network (vPLMN) from which the UE can obtain access to 3GPP services; and transmitting an indication of the selected vPLMN towards the UE.

In an embodiment of the second aspect of the present invention, the authentication server is a 3GPP compliant Authentication Authorization and Accounting (AAA) server. In another embodiment, the identification of the UE includes an identification of the non 3GPP compliant access network, and wherein the location information is determined in accordance with the identification of the non 3GPP compliant access network. The location information can be determined, in some embodiments, in accordance with the identification of the non 3GPP compliant access network and other networks visible to the UE. In another embodiment, location information is provided by the UE to the authentication server and may include Global Positioning System (GPS) based location information and/or an identification of the non-3GPP compliant access network and other WiFi networks near the UE. In a further embodiment, the indication of the selected vPLMN is a PLMN identifier (ID) or an address of a visiting enhanced packet data gateway (v-ePDG) associated with the PLMN.

In a third aspect of the present invention, there is provided a user equipment (UE) for obtaining access to 3rd generation partnership project (3GPP) services through a non-3GPP compliant access network. The UE comprises a non-3GPP access interface, an access network configuration data store and an access configuration engine. The non-3GPP access interface connects the UE to a non 3GPP compliant access network. The access network configuration data store stores access network configuration data. The access configuration engine establishes a first access network configuration in conjunction with network parameters obtained through the non-3GPP access network interface from the non-3GPP compliant access network, stores the established first access network configuration in the access network configuration data store, requests authentication from an authentication server through the connected access network, receives, in response to the authentication request, an indication of a visiting public land mobility network (vPLMN) to connect to obtain 3GPP services, and establishes a second access network configuration in accordance with both the network parameters from the non-3GPP compliant access network and the received indication of the vPLMN.

When a mobile device attaches to a non-3GPP network, it can perform an AAA procedure with a 3GPP AAA. In addition to standard AAA process, the 3GPP AAA can perform a lookup based on information associated with the 3GPP AAA interactions to determine an appropriate vPLMN ID and v-ePDG address associated with the user equipment location. This information can then be provided to the UE so that its connection to the network can be appropriately configured. The lookup and assignment procedure could also be moved from the 3GPP AAA to another node in the 3GPP based network, so long as user equipment authentication to the home network results in the relevant lookup and communication being performed to provide the UE with the relevant data.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for determining the Enhanced Packet gateway of a 3GPP network, such as a roaming network, through a non-3GPP connection.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As noted above, there is a plurality of reasons, both business and technical, for a device that has left the coverage area of its home network to make use of a visiting network's v-EPDG even when connecting through a non-3GPP access network. By connecting to the v-EPDG, the traffic of that device can be subjected to the traffic policies of both the home and visiting network, and a variety of different instructions can be provided to the device so that it will be part of a managed network.

When a device is powered on and receives a roaming network list over the radio access network (RAN), it is able to perform an Authentication, Authorization, and Accounting (AAA) authentication procedure, and obtain the v-ePDG through a DNS query using the PLMN ID. A device that makes a non-3GPP connection connects to a non-3GPP network, such as a WiFi hotspot typically simply connects to the Internet. Many WiFi hotspots make an allowance for the use of AAA server for many reasons. Many of these WiFi networks are also affiliated with carriers, so the use of AAA servers for roaming devices is becoming more and more common.

UE can be required, by a set of self-contained rules, to attempt a 3GPP based authentication when connecting to non-3GPP networks. During the authentication procedure, the 3GPP AAA server receives an identifier of the access network through which the UE is connecting. This can be used to determine that the UE is roaming, and that it has not connected through a vPLMN. Upon determining a registration through such an un-trusted access network, the 3GPP AAA can obtain a vPLMN ID from the UE's home network HSS. This vPLMN ID, or a corresponding v-ePDG address can be obtained from the HSS and forwarded to the UE by the 3GPP AAA.

Upon receipt of the vPLMN ID, or the v-ePDG address, the UE can then use the resources of the visiting network through the non-3GPP access. The result of the enhanced 3GPP AAA procedure is that the UE is directed to the appropriate gateways so that its traffic can be managed appropriately. This procedure is often transparent to the user and does not rely on the device being compatible with the RAN of the visiting network.

Figure 1:
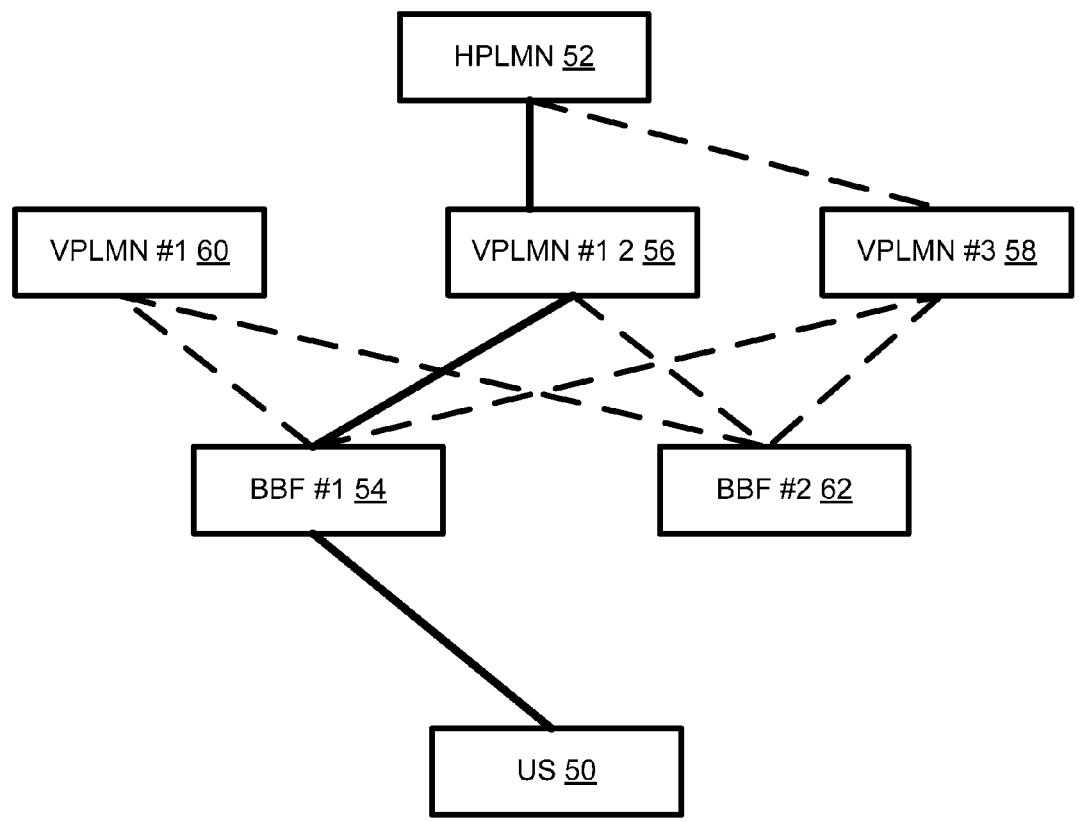
FIG. 1 illustrates a relationship between a plurality of different Public Land Mobility Networks.
Figure 2:
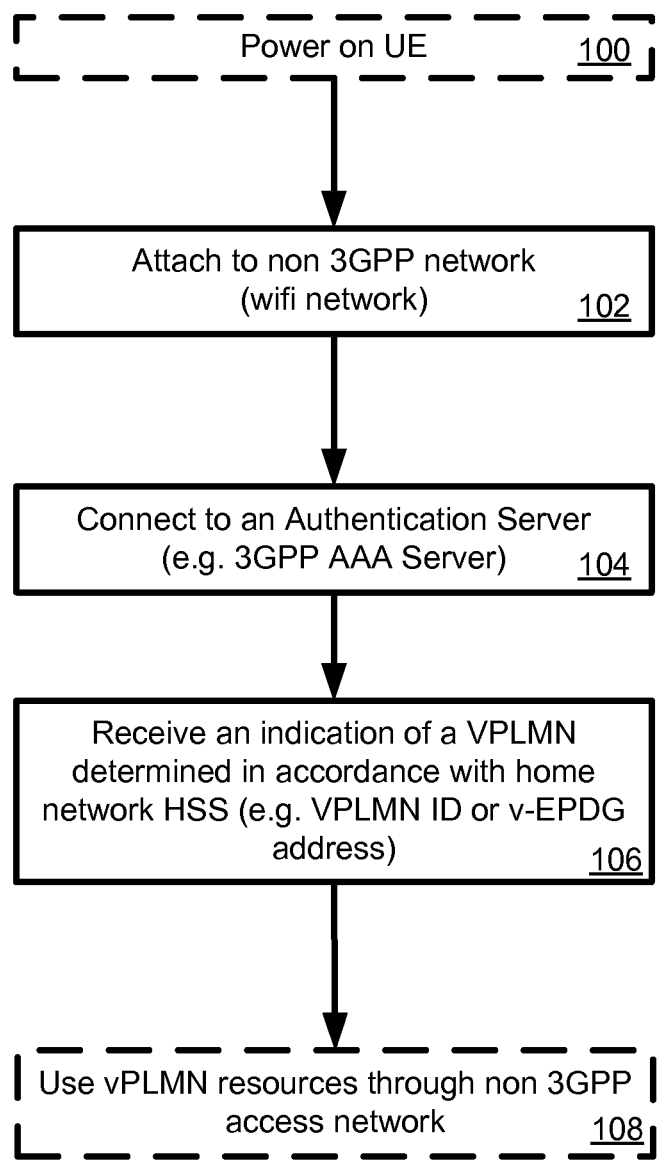
FIG. 2 illustrates an exemplary method of the present invention for execution at a UE.

With reference to the above description, FIG. 2 illustrates and exemplary embodiment of a method of the present invention. In step 100, the UE is powered on. If the UE does not connect to a VPLMN radio access network, it will not be able to obtain network configuration options or a network connection. To solve the issue surrounding the lack of network connection to the UE, the UE connects to a non-3GPP network in step 102. One skilled in the art will appreciate that any number of different networks can be connected to, but for the sake of the following discussion, it will be assumed that the UE connected to a Wifi network. In step 104, the UE connects to an authentication server, such as a 3GPP compliant AAA server. In making this connection, information is provided to the AAA server related to the location of the UE. This information could include location data obtained using a GPS based reading, or it could simply be the name of the non-3GPP network. In response to an authentication process, the UE receives, in step 106, an indication of a VPLMN that has been determined in consultation with the HSS in a home PLMN associated with the UE. The VPLMN can be specified using a VPLMN ID or by providing the address of a v-ePDG in the VPLMN. In step 108, the UE can update its configuration based on the information receiving in step 106 and access the VPLMN resources through the non-3GPP access network.

Figure 3:
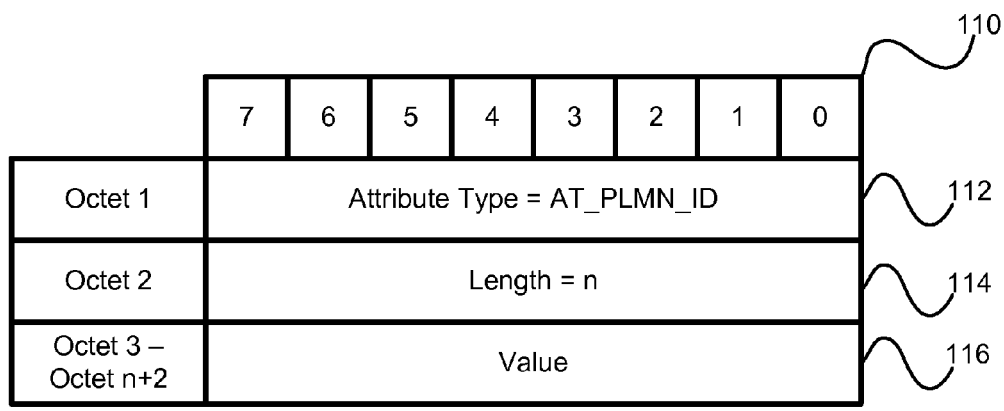
FIG. 3 illustrates an exemplary PLMN ID attribute.

In one presently envisioned embodiment, the PLMN Identity is indicated in the Network Name Field of the AT_PLMN_ID attribute. The Network Name Field can be used to provide the PLMN Identity in a variety of different formats including the one illustrated in FIG. 3. During the AAA procedure, the UE can be provided the vPLMN ID that allows identification of the v-ePDG. FIG. 3 illustrates an exemplary format for a PLMN ID attribute 100 provided to the user in step 106 of FIG. 2. The attribute 100 includes an attribute type 120 that specifies that it is a PLMN ID. A length 114 is specified as is a PLMN ID value 116.

Figure 4:
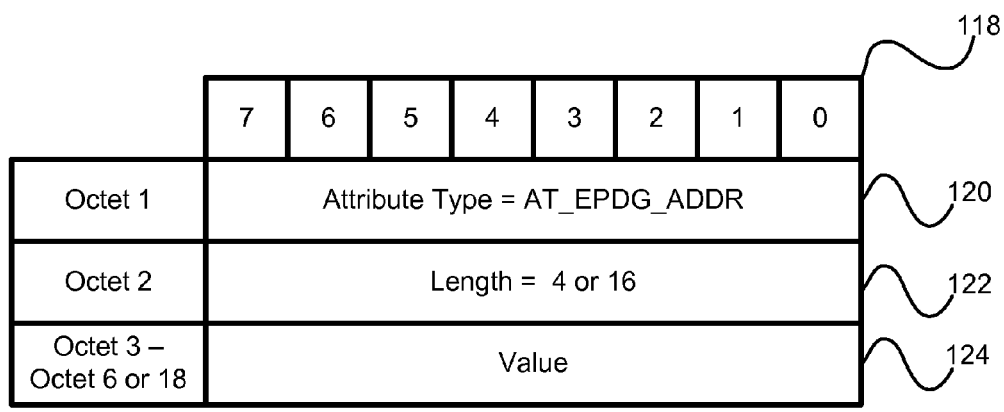
FIG. 4 illustrates an exemplary EPDF ADDR attribute.

The ePDG Address can also be indicated in the Network Name Field of the AT_EPDG_ADDR attribute. The Network Name Field can be used to provide the ePDG Address as illustrated in the FIG. 4. When the UE receives the ePDG address through the receipt of the AT_EPDG_ADDR attribute 118, the UE can then use the provided ePDG address for the IPSec tunnel establishment. The AT-EPDG_ADDR attribute 118 includes an attribute type specification 120, a length field 122 exemplarily shown as allowing either a 4 or 16 bit length, and an EPDG address value 124.

Those skilled in the art will appreciate that these modifications to existing non-3GPP attachment procedures can provide the home network with the ability to provide the visited ePDG address and/or the vPLMN ID when the UE attaches through an un-trusted access network. The HSS, the 3GPP AAA, and the UE may be impacted by the presently described process, but it is possible to provide an implementation that has little to no impact on other existing network elements.

As noted above, the presently proposed solution allows the UE to connect to a non-3GPP access network when the UE does not know a vPLMN ID. Such a connection, for example a WiFi connection, can be used for a AAA authentication procedure, that will result in the UE receiving at least one of the vPLMN ID and the v-EPDG address. This information can then be used to configure the non-3GPP access on the UE so that the UE is able to participate as an element in a more managed network.

One skilled in the art will appreciate that although the above description makes use of a network identifier for the non-3GPP access network as a factor in the determination of the vPLMN ID and v-ePDG address, other information provided by the user can be used in place of this information. In one illustrative example, the UE can make use of location based services such as GPS, or WiFi based location determination, to provide location information in the 3GPP AAA procedure. This location information could then be used to select an appropriate VPLMN ID. One skilled in the art will appreciate that when using WiFi based location determination, the information used to determine the location can be sent through the 3GPP AAA communications so that a network element can perform the actual location determination. Other such information that will place the user in a specific region (including explicitly querying the user) can be used to the same effect without departing from the intended scope of the present invention.

Figure 5:
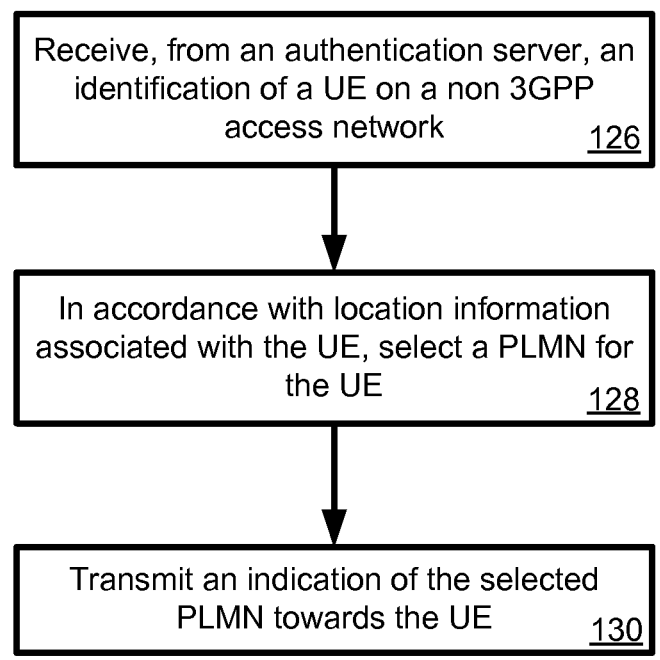
FIG. 5 illustrates an exemplary method of the present invention for execution at an HSS in the home network of the UE.

FIG. 5 illustrates a method for execution, at the HSS in the home network associated with the UE, in response to communications received as a result of the UE performing the method of FIG. 2. In step 126, the HSS receives an identification of a UE on a non-3GPP access network from an authentication server such as a 3GPP compliant AAA server in the home network. In accordance with location information associated with the UE the HSS, in step 128, selects a PLMN that the UE should connect to as its VLPMN. One skilled in the art will appreciate that this selection can be done using geographic information about the UE, such as a reported GPS location, or even using the SSID of the access network connection (or other nearby networks) which can then be used to determine a location. In step 130, an indication of the selected PLMN is transmitted towards the UE. This can be done by providing the indication to the authentication server which will return the information to the UE in response to an initial authentication connection request.

Figure 6:
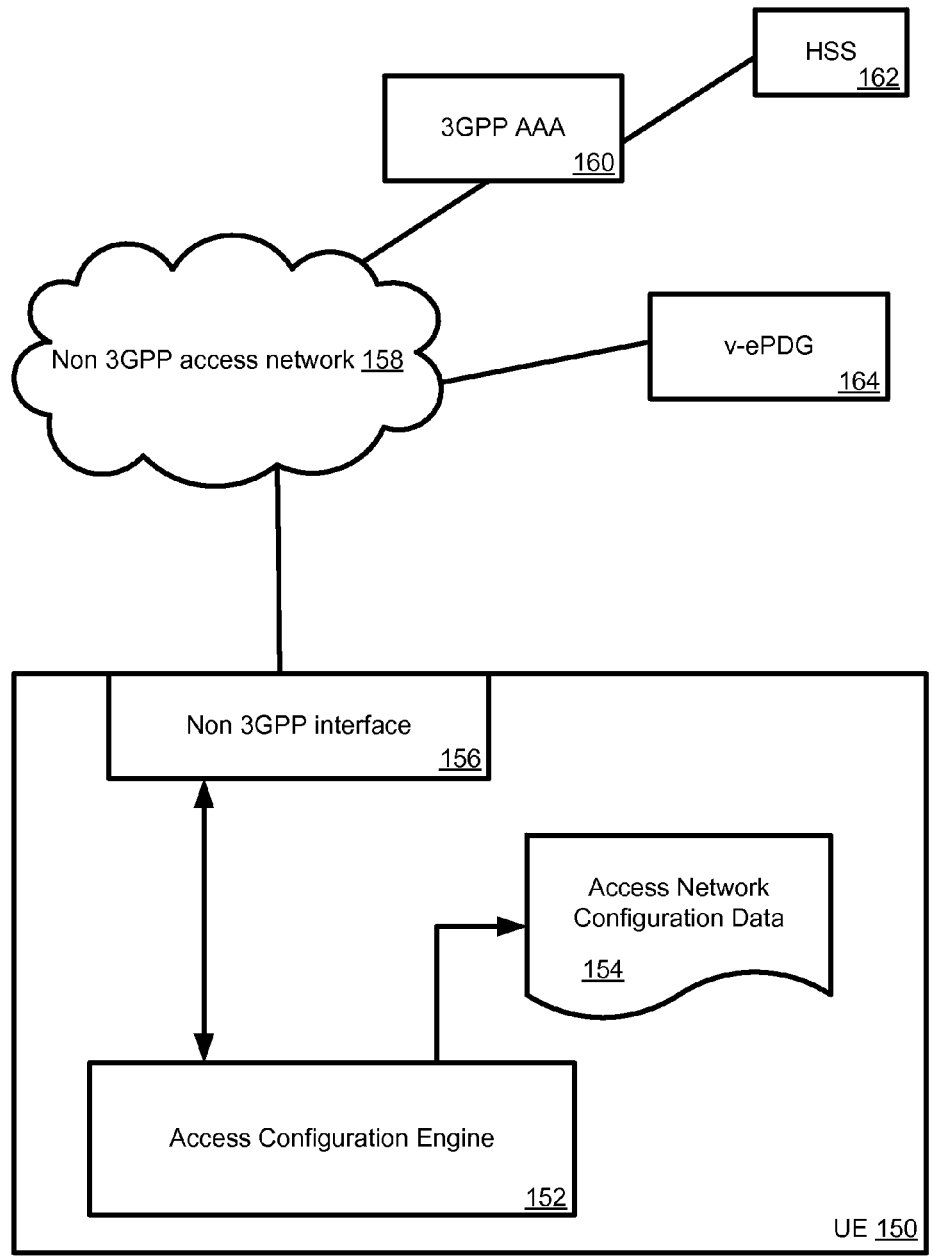
FIG. 6 is a block diagram illustrative of a UE of an embodiment of the present invention.

FIG. 6 illustrates an exemplary UE 150 that includes an access configuration engine 152 for generating and modifying access network configuration data 154. When the UE 150 is not connected to a PLMN, it can use its Wifi interface 156 to determine available access networks. One skilled in the art will appreciate that in other networks (such as a Bluetooth personal area network, or a WiMax connection) the interface can be more generically referred to as a non 3GPP access interface. A configuration is then generated by the access configuration engine 152 and stored as network configuration data 154 in an network configuration data store. The access configuration engine then connects, through non 3GPP access network 158 to an authentication server such as 3GPP AAA 160. In consultation with the HSS 162, the 3GPPP AAA 160 will send an indication of a VPLMN associated with v-ePDG 164 to the UE 150. Upon receipt of the indication, access configuration engine 152 will update the access network configuration data 154 so that UE 150 can make use of resources offered by v-EPDG 164.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

Nodes discussed above, including the UE, the 3GPP AAA servers, the HSS, various ePDGs, etc., will be understood to be implemented in a combination of hardware and software, and could be implemented using any number of combinations of customized and purpose built hardware with varying amounts of firmware and software, including both operating systems and applications, having memories, processors, and interfaces to networks and other devices. Those skilled in the art will appreciate that these functions are properly implemented in systems that may be distributed across a plurality of different physical nodes, or implemented in a single system. The actual implementation of the physical instance of these nodes need not be considered as germane to the present invention.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of configuring access through a non 3rd generation partnership project (3GPP) compliant access network for execution by a user equipment (UE), the method comprising:
    attaching to a non-3GPP compliant access network;
    connecting, through the attached access network, to a 3GPP compliant Authentication Authorization and Accounting (AAA) server without the use of an a priori knowledge of a visiting Public Land Mobility Network (vPLMN) to connect to for access to 3GPP services; and
    receiving an indication of the visiting Public Land Mobility Network (vPLMN) to connect to for access to 3GPP services.

2. The method of claim 1 wherein the non-3GPP compliant access network is a WiFi access network.

3. The method of claim 1 wherein the AAA server is associated with a home network associated with the UE.

4. The method of claim 1 wherein the indication of the vPLMN is a Public Land Mobility Network Identifier.

5. The method of claim 1 wherein the indication of the vPLMN is an address of a visiting enhanced packet data gateway (v-ePDG) associated with the Public Land Mobility Network.

6. The method of claim 1 further comprising the step of reconfiguring access policies in the UE in accordance with the received indication.

7. A method of providing configuration data to a user equipment (UE) associated with a home subscriber server (HSS), the UE connected to a non 3rd generation partnership project (3GPP) compliant access network, the method for execution by the home subscriber server and comprising:
    receiving, from an authentication server, an identification of the UE;
    in accordance with location information associated with the UE, selecting a visiting public land mobility network (vPLMN) from which the UE can obtain access to 3GPP services; and
    transmitting an indication of the selected vPLMN towards the UE.

8. The method of claim 7 wherein the authentication server is a 3GPP compliant Authentication Authorization and Accounting (AAA) server.

9. The method of claim 7 wherein the identification of the UE includes an identification of the non 3GPP compliant access network, and wherein the location information is determined in accordance with the identification of the non 3GPP compliant access network.

10. The method of claim 9 wherein the location information is determined in accordance with the identification of the non 3GPP compliant access network and other networks visible to the UE.

11. The method of claim 7 wherein the location information is provided by the UE to the authentication server.

12. The method of claim 11 wherein the location information is Global Positioning System (GPS) based location information.

13. The method of claim 7 wherein the non 3GPP compliant access network is a Wifi network, and the location information includes an identification of the non-3GPP compliant access network and other WiFi networks near the UE.

14. The method of claim 7 wherein the indication of the selected vPLMN is a Public Land Mobility Network (PLMN) identifier (ID).

15. The method of claim 7 wherein the indication of the selected vPLMN is an address of a visiting enhanced packet data gateway (v-ePDG) associated with the Public Land Mobility Network.

16. A user equipment (UE) for obtaining access to 3rd generation partnership project (3GPP) services through a non-3GPP compliant access network, the UE comprising:
    a non-3GPP access interface for connecting the UE to a non 3GPP compliant access network;
    an access network configuration data store for storing access network configuration data; and
    an access configuration engine
        for establishing a first access network configuration in conjunction with network parameters obtained through the non-3GPP access network interface from the non-3GPP compliant access network,
        for storing the established first access network configuration in the access network configuration data store,
        for requesting authentication from a 3GPP compliant Authentication Authorization and Accounting (AAA) server through the connected access network without the use of a priori knowledge of a visiting Public Land Mobility Network (vPLMN) to connect to for access to 3GPP services, for receiving, in response to the authentication request, an indication of the vPLMN to connect to to obtain 3GPP services, and for establishing a second access network configuration in accordance with both the network parameters from the non-3GPP compliant access network and the received indication of the vPLMN.

\* \* \* \* \*